US008692891B2

(12) United States Patent
Li et al.

(10) Patent No.: US 8,692,891 B2
(45) Date of Patent: Apr. 8, 2014

(54) SYSTEM AND METHOD OF IMPLEMENTING A TV BAND DEVICE WITH ENHANCED SPECTRUM SENSING

(75) Inventors: Lingjie Li, Ottawa (CA); Jung Yee, Ottawa (CA)

(73) Assignee: Aurora Wireless, Inc., Ottawa (CA)

(*) Notice: Subject to any disclaimer, the term of this patent is extended or adjusted under 35 U.S.C. 154(b) by 83 days.

(21) Appl. No.: 13/275,006

(22) Filed: Oct. 17, 2011

(65) Prior Publication Data
US 2012/0314088 A1 Dec. 13, 2012

Related U.S. Application Data

(63) Continuation-in-part of application No. 13/235,220, filed on Sep. 16, 2011, now abandoned.

(60) Provisional application No. 61/494,689, filed on Jun. 8, 2011.

(51) Int. Cl.
| H04N 17/00 | (2006.01) |
| H04N 17/02 | (2006.01) |
| H04N 5/50 | (2006.01) |
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........... 348/192; 348/180; 348/735; 370/329; 370/252

(58) Field of Classification Search
None
See application file for complete search history.

(56) References Cited

U.S. PATENT DOCUMENTS

| 8,150,328 | B2* | 4/2012 | Chaudhri et al. .......... 455/67.11 |
| 2009/0102981 | A1 | 4/2009 | Mody |
| 2010/0124254 | A1 | 5/2010 | Wu et al. |
| 2010/0182928 | A1* | 7/2010 | Wu et al. ........................ 370/252 |
| 2010/0195590 | A1* | 8/2010 | Park .............................. 370/329 |
| 2010/0309317 | A1* | 12/2010 | Wu et al. ....................... 348/180 |
| 2011/0043710 | A1* | 2/2011 | Samarasooriya et al. .... 348/735 |
| 2011/0116484 | A1 | 5/2011 | Henry |
| 2012/0120904 | A1* | 5/2012 | Seok et al. .................... 370/329 |

FOREIGN PATENT DOCUMENTS

| EP | 2 317 814 A1 | 5/2011 |
| WO | 2011008424 A2 | 1/2011 |

OTHER PUBLICATIONS

Extended European search report for related EP 12171239.2, Sep. 19, 2012, in 6 pages.
Kang. "Spectrum Sensing Issues in Cognitive Radio Networks." ISCIT 2009. 9th International Symposium on Communications and Information Technology. Sep. 28, 2009. pp. 824-828.

(Continued)

Primary Examiner — Jefferey Harold
Assistant Examiner — Sean Haiem
(74) Attorney, Agent, or Firm — Procopio, Cory, Hargreaves & Savitch LLP

(57) ABSTRACT

A TV band device for indoor applications uses information gleaned from a database inquiry based on geo-location information in combination with spectrum sensing to determine if TV channels are available for unlicensed use.

25 Claims, 3 Drawing Sheets

(56) References Cited

OTHER PUBLICATIONS

Murty et al. "SenseLess: A Database-Driven White Spaces Network." 6th IEEE Symposium on Dynamic Spectrum Access Networks (DySpan). 2011. 12 pages.

Federal Communications Commission Order No. FCC 10-174, Adopted Sep. 23, 2010. In the Matter of Unlicensed Operation in the TV Broadcast Bands—Additional Spectrum for Unlicensed Devices Below 900 MHz and in the 3 GHz Band. 88 pages.

Ecclesine. IEEE P802.11, Wireless LANs. FCC TVWS orders Jan. 11 consolidated text. Jan. 2011. 23 pages.

* cited by examiner

SYSTEM AND METHOD OF IMPLEMENTING A TV BAND DEVICE WITH ENHANCED SPECTRUM SENSING

RELATED APPLICATIONS

The present application is a continuation-in-part of U.S. patent application Ser. No. 13/235,220 filed Sep. 16, 2011, which claims the benefit of pending U.S. provisional patent application No. 61/494,689 filed on Jun. 8, 2011, the contents of which are incorporated herein by reference in their entirety.

FIELD OF THE INVENTION

This invention relates in general to cognitive radio and, in particular, to an efficient spectrum sensor for indoor TV white space applications.

BACKGROUND OF THE INVENTION

With the transition from analog to digital TV, empty TV channels are now available for use by other wireless applications. These empty channels are called TV white space. The two most common means of protecting licensed services (incumbents) that operate in the TV band are: the use of geo-location information with database inquiry; and, TV white space spectrum sensing by TV band devices.

A TV band device that uses the geo-location information with database inquiry technique provides a TV white space database with its current location, and the database responds with a list of available TV white space channels that the TV band device may use. The TV band device then transmits on one or more of those channels. Although this method is simple and efficient, it has certain drawbacks. One drawback is that the geo-location information needs to be very accurate. If the geo-location information provided to the database is not precise, the database must be operated on a principle that the TV band device may be anywhere within an area indicated by a lowest level of specificity of the geo-location information provided. The database is therefore programmed to protect incumbents by returning conservative inquiry results, which compromises TV white space utility.

As an alternative, a TV band device may use spectrum sensing to locate unused TV white space channels. For example, in a recent FCC ruling for TV white space, sense-only TV band devices are permitted to rely exclusively on spectrum sensing to detect available TV white space channels. The sensitivity level is −114 dBm for ATSC and NTSC signals, and −107 dBm for low power auxiliary signals including wireless microphone signals. These sensitivity levels need to be achieved in the presence of an adjacent channel ATSC signal as strong as −28 dBm.

However, the sense-only mode has some fundamental technical drawbacks which make it difficult to implement. First, the sensitivity levels set by governing authorities are difficult to achieve, especially in the presence of high power adjacent channel signals. Second, while spectrum sensing can determine the existence of a signal in a TV channel, as well as the type of signal that was detected, spectrum sensing cannot tell if the signal originated from a licensed or an unlicensed source. Third, the sense-only mode does not provide a mechanism to permit a governing authority to exclude the TV band device from any particular channel, if required. Furthermore, there are many types of licensed signals in the TV band, and the spectrum sensing capability of a TV band device may only be capable of detecting certain ones of those licensed signal types, which leaves those undetectable types of licensed signals unprotected. There are also certain excluded areas, such as along the U.S./Canadian border region, and areas around radio astronomy receiver sites where TV band devices may not be permitted to utilize TV white space. As understood by those skilled in the art, it may prove difficult to use spectrum sensing to determine if a TV band device is within an excluded area.

There therefore exists a need for a system and method of implementing a TV band device with enhanced spectrum sensing.

SUMMARY OF THE INVENTION

Systems and methods of implementing a white space (e.g., TV white space) band device with enhanced spectrum sensing are provided.

One embodiment provides a system for implementing a TV band device with enhanced spectrum sensing. The system includes a variable resolution geo-location server that receives geo-location information from the TV band device, translates the geo-location information into a location indicator, and returns the location indicator to the TV band device; a TV band white space database front end that receives the geo-location indicator from the TV band device and uses the location indicator to compile a TV channel list that is returned to the TV band device; and a spectrum sensor available to the TV band device, the spectrum sensor being adapted to detect certain TV band signal types.

In a further aspect a TV band device includes a spectrum sensor adapted to sense certain TV band signal types; a memory for storing geo-location information; a memory for storing a TV channel list; and TV white space management logic that comprises program instructions adapted to communicate with the spectrum sensor and access the geo-location information and TV channel list in the memory.

Another embodiment provides a method of enhancing spectrum sensing by a TV band device. The method includes providing a variable resolution geo-location server with geo-location information available to the TV band device; receiving a location indicator from the variable resolution geo-location server; passing the location indicator to a TV white space database front end and requesting a TV channel list from the TV white space database front end; and inspecting the TV channel list to determine whether there is a TV channel with an empty signal type designation available for use by the TV band device.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE PREFERRED EMBODIMENTS

The embodiments of the invention can provide systems and methods of implementing a TV band device with enhanced spectrum sensing. The TV band device registers with a TV white space database using variable resolution geo-location information; and the database responds with a TV band channel list that designates a signal type for each channel. After analyzing the channel list, the TV band device conducts spectrum sensing on TV white space channels that are potentially available for use, and combines the sensing results with the database inquiry results to determine which TV white space channel(s) to use. The embodiments enable reliable protection for licensed TV band services, and maximizes TV white space channel utility. Variable resolution geo-location resolves the problem of how to accurately determine the location of a TV band device in an indoor environment. With the information obtained from both spectrum sensing and database inquiry, the loss of TV white space utility due to an inaccurate propagation model used by the TVWS database and lower geo-location information accuracy is reduced. The embodiments can also enable governing authorities to exclude a TV band device from one or more channels, if necessary. Moreover, the embodiments can reduce the influence of TV white space jammers. The database inquiry results can also be used to identify TV white space jammers, mitigating the problem that spectrum sensing cannot determine whether a detected signal is from a licensed source.

Though the invention is described in terms of TV white space, that is only an example embodiment. For example, the invention it can be implemented in other bands where the ability to use the band can be determined by sensing traffic in the channel or where geographic availability can be obtained from a source.

Figure 1:
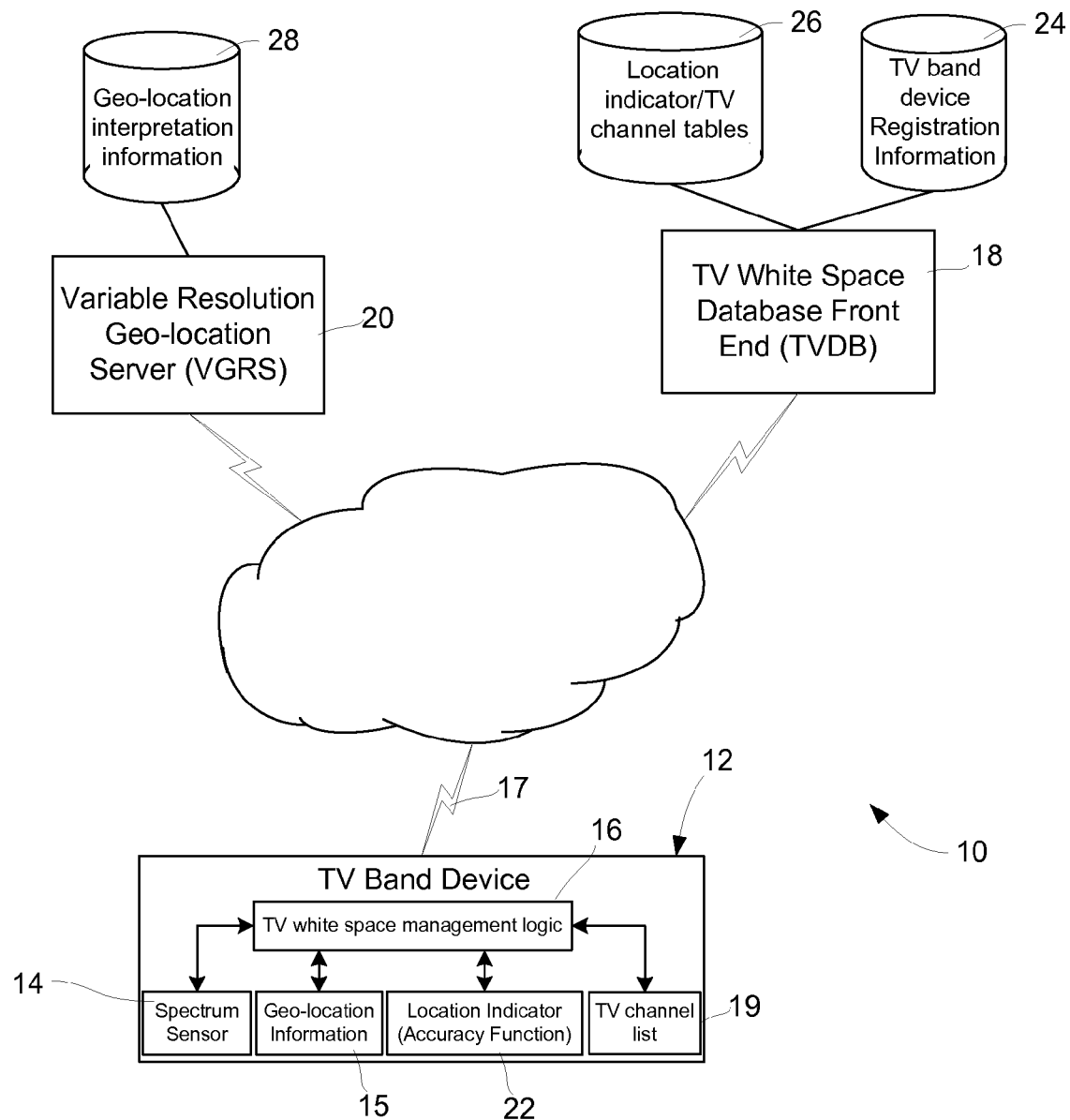
FIG. 1 is a functional block diagram of an embodiment of a system for implementing a TV band device with enhanced spectrum sensing in accordance with the invention.

FIG. 1 is a functional block diagram of an embodiment of a system 10 for implementing a TV band device 12 with enhanced spectrum sensing in accordance with the invention. The TV band device 12 has a spectrum sensor 14 that can detect whether one or more certain detectable signal types is/are present in a given TV channel, using methods that are known in the art and described for example in United States patent application US 2011/0043710A1, the specification of which is herein incorporated by reference in its entirety. The TV band device 12 also has a memory for storing geo-location information 15, which is input by a user, or otherwise acquired by the TV band device 12, and TV white space management logic or module 16, for example running on a processor. The TV white space management logic communicates with the spectrum sensor 14 and interprets sensing information the spectrum sensor 14 outputs, for example, using program instructions stored in the memory. The TV white space management logic 16 also accesses to the geo-location information 15 stored in the memory and extract the information and package it for communication for example, using program instructions stored in the memory. The TV white space management logic 16 likewise accesses a communications link 17 to communicate with a TV white space database front end 18, hereinafter the TVDB 18 for example, using program instructions stored in the memory. The TV white space management logic 16 also communicates via the communications link 17 with a variable resolution geo-location server 20, hereinafter the VRGS 20 for example, using program instructions stored in the memory. All communications with the TVDB 18 and the VRGS 20 are controlled by the TV white space management logic 16 using known communication methods. The TV white space management logic 16 also receives a TV channel list 19 from the TVDB 18 and stores it in memory for example, using program instructions stored in the memory. The structure and function of the TV channel list 19 will be explained in detail below with reference to FIGS. 2 and 3.

The TVDB 18 has access to a database of TV band device registration information 24 that it dynamically maintains. The TVDB 18 also has access to a location indicator/TV channel table database 26 that is maintained, for example, by a government authority. The VRGS 20 transforms the geo-location information 15 provided by the TV band device 12 into a location indicator 22 using geo-location interpretation information stored in a database 28. The location indicator 22 is stored by the TV band device 16. The location indicator 22 is in a format that can be utilized by the TVDB 18 to extract TV channel information from the location indicator/TV channel tables 26, as will be explained below in more detail.

Figure 2:
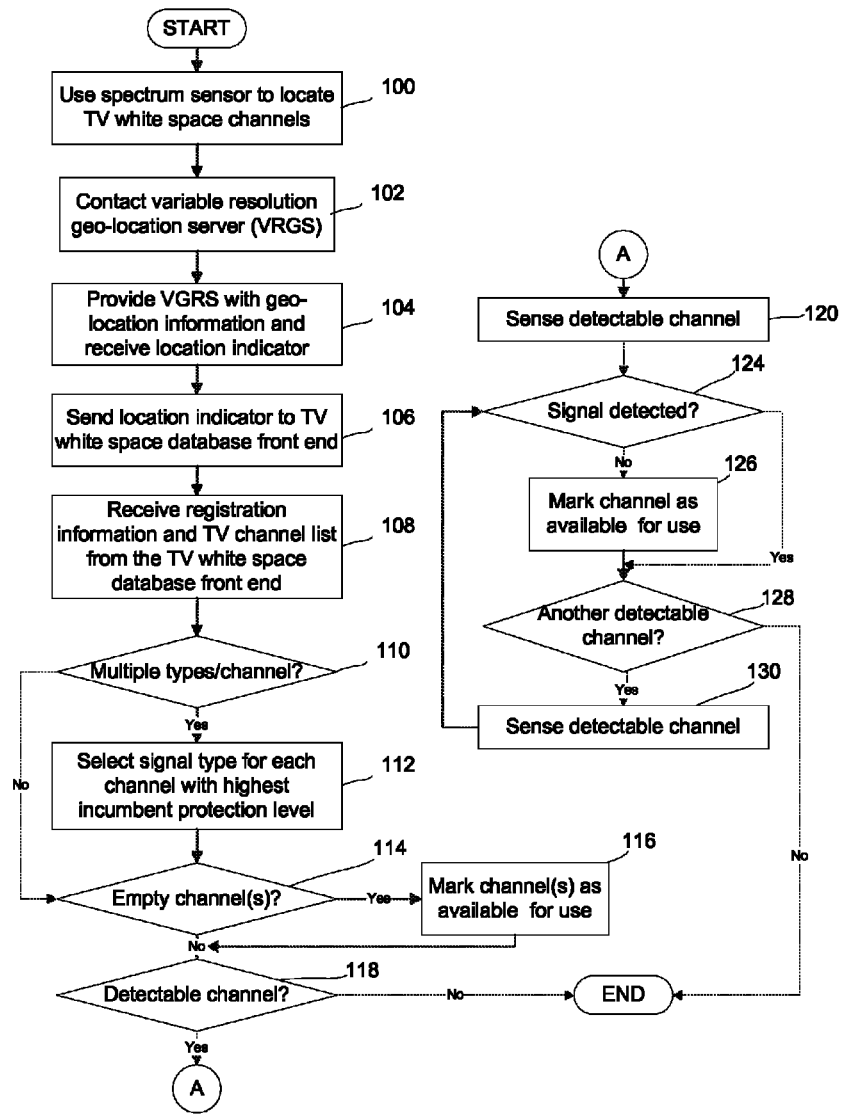
FIG. 2 is a flow chart of an overview of one implementation of a sensing procedure used by the TV band device shown in FIG. 1.

FIG. 2 is a flow chart illustrating principal steps in an embodiment of a method in accordance with the invention. When the TV band device 12 begins operation, the TV white space management logic 16 instructs the spectrum sensor 14 to locate (100) TV white space channels. The TV white space management logic 16 then uses one of the white space channels, or another communications link, to contact (102) the VRGS 20. The TV white space management logic 16 provides (104) the VRGS 20 with its geo-location information 15 stored in memory in a predefined format. The geo-location information 15 may be, by way of example only, any one or more of the following:

Zip code or postal code;
City/town, county, and/or province/state name;
Detailed address: unit number, street, town, etc.;
Longitude and latitude with a standardized indication of their accuracy;
Location information generated by some other geo-location mechanism.

The geo-location information 15 stored in the memory of the TV band device 12 and sent to the VRGS 20 is interpreted by the VRGS 20 to create the location indicator 22 for the TV band device 12. The VRGS 20 may also be provisioned with logic to associate an optional location accuracy function with each location indicator 22 it returns to the TV band device 12. If provided, the location accuracy function is expressed in a format that can be used by the TVDB 18. The VRGS 20 responds (104) to the TV band device 12 with the location indicator 22, which is in a format that can be used by the TVDB 18 to access the location indicator/TV channel table database 26. In an alternative embodiment, the TV band device performs the functions of the VRGS itself. The VRGS may also return the optional location accuracy function with the location indicator 22. The TV white space management logic 16 stores the location indicator 22 in memory, and then sends (106) the location indicator 22, and the optional location accuracy function if provided, to the TVDB 18 for registration. If no location accuracy function is received, then a pre-determined accuracy function may be assigned by the TVDB 18. In one embodiment the TV white space management logic 16 also sends spectrum sensing capabilities of the spectrum sensor 14 expressed in a standardized format, with the location indicator 22 to the TVDB 18. For example, the TV white space management logic 16 sends a list that details each type of signal that the spectrum sensor 14 can reliably detect.

The TVDB 18 registers the TV band device 12, and responds (108) with registration information and the TV channel list 19, which provides signal types for all TV channels in which the TV band device 12 may operate. If the TV white space management logic 16 has sent sensing capability information to the TVDB 18, the TVDB 18 sends preset signal types used to indicate what wireless signal is, or may be, present on each channel within the area specified by the location indicator 22. Those preset signal types include: prohibited, undetectable, detectable, and empty. The signal type "prohibited" is used to indicate that a channel cannot be used by TV band devices operating in the area, and the signal type "empty" is used to indicate that a TV channel is available for unlicensed usage.

The signal type "detectable" indicates that signals on the TV channel can be reliably detected by the TV band device 12 using the spectrum sensor 14. If a TV channel is licensed for use by a signal which cannot be reliably detected by the spectrum sensor 14, the signal type "undetectable" is associated with that TV channel. It is possible that more than one type of signal is present within the local area defined by the location indicator 22. As an example, part of the area may be within a DTV protected contour, and another part within a prohibited region. In such a case, the signal type that represents the highest level of incumbent protection is communicated by the TVDB 18 to the TV band device 12. In accordance with the embodiment, "prohibited" has the highest protection level, next is the "undetectable" signal type, the third level is the "detectable" signal type, and "empty" is the lowest protection level. In this example, "prohibited" should be used for the signal type in the whole area. To ensure incumbent signal protection, the lower the level of location accuracy, the more conservative is the TV channel list 19 provided by the TVDB 18.

If the TV white space management logic 16 does not send sensing capability information, the TVDB 18 returns more detailed signal types to the TV band device 12. Consequently, "detectable" and "undetectable" signal types can be replaced by physical signal types such as ATSC, NTSC, wireless microphone, etc. For example, a channel may contain signals of types "ATSC" and "wireless microphone". If both signals are detectable by the TV band device 12, it can conduct spectrum sensing on both signals. If the TV band device 12 can only detect ATSC signals, then this channel is "undetectable" and cannot be used by the TV band device 12.

In either instance, the TV white space management logic 16 determines (110) whether the TV channel list 19 includes multiple signal types per channel. If so, TV white space management logic 16 (112) selects the signal type from the list with the highest incumbent protection level as the signal type for that channel.

Table 1 lists the signal types that may be associated with a TV channel, as well as the signal type selected (112) by the TV band device 12 for the TV channel.

TABLE 1

| Signal types included in the channel (marked by "x") | | | | Signal type used by TV band device |
|---|---|---|---|---|
| Empty | Detectable | Undetectable | Prohibited | |
|  |  |  | x | Prohibited |
|  |  | x |  | Undetectable |
|  |  | x | x | Prohibited |
|  | x |  |  | Detectable |
|  | x |  | x | Prohibited |
|  | x | x |  | Undetectable |
|  | x | x | x | Prohibited |
| x |  |  |  | Empty |
| x |  |  | x | Prohibited |
| x |  | x |  | Undetectable |
| x |  | x | x | Prohibited |

TABLE 1-continued

| Signal types included in the channel (marked by "x") | | | | Signal type used by TV band device |
|---|---|---|---|---|
| Empty | Detectable | Undetectable | Prohibited | |
| x | x |  |  | Detectable |
| x | x |  | x | Prohibited |
| x | x | x |  | Undetectable |
| x | x | x | x | Prohibited |

For the TV channels included in the database inquiry response, channels which are "prohibited" or with "undetectable" signal types cannot be used by the TV band device 12. Channels which are "empty" can be used by the TV band device 12 without spectrum sensing. The remaining channels with "detectable" signal types must be sensed prior to use. For each TV channel indicated as having "detectable" signals, if the spectrum sensor 14 cannot find a signal on the channel, then the TV band device 12 can use the channel, otherwise the TV band device 12 cannot use it. Table 2 shows the decision process performed by the TV white space management logic 16 for each of the four signal types.

TABLE 2

| Signal type | TV white space management logic decision |
|---|---|
| Prohibited | Channel not used |
| Undetectable | Channel not used |
| Empty | Channel can be used without sensing |
| Detectable | Channel can be used if spectrum sensing detects no signal |
|  | Channel not used if spectrum sensing detects a signal |

Consequently, after the TV white space management logic 16 selects, if required, the signal type for each channel in the TV channel list 19 provided by the TVDB 18, the TV white space management logic 16 determines (114) if there are one or more channels with the "empty" signal type. If so, the TV white space management logic 16 marks (116) those channel(s) as available for use. The TV white space management logic 16 then reviews the TV channel list 19 and determines (118) if there are one or more channels that carry "detectable" signals. If not, the process ends. Otherwise, the TV white space management logic 16 instructs the spectrum sensor 14 to sense (120) the first "detectable" channel for detectable signals. If a signal is not detected (124), the TV white space management logic 16 marks that channel as available for use. If a signal is detected (124), the TV white space management logic 16 determines (128) if there is another channel in the list with the "detectable" signal type. If so, the spectrum sensor 14 is instructed to sense that channel (130) and the process returns to step (124), until the TV white space management logic 16 has had all of the channels with the "detectable" signal type sensed by the spectrum sensor 14 to determine if they carry detectable signals. One or more of those channels as available for use can then be used by the TV band device (or another associated device) for transmissions.

As explained above, the signal type "prohibited" may be used by governing authorities to exclude TV band device 12 transmissions from a given TV channel in a specific geographic area. When the TV white space management logic 16 contacts the TVDB 18 for registration, all channels that are listed as "prohibited" by the TVDB 18 cannot be used by the TV band device 12. Alternatively at any time deemed necessary, governing authorities may ask the TVDB 18 to send an updated TV channel list 19 to all TV band devices 12 that are registered in a given geographic area to exclude their transmissions from certain channels. As an example, if a governing authority received telephone calls from DTV customers in a building complaining about interference on a specific TV channel, the government authority could choose to mark that channel as "prohibited" in the local area surrounding the building. The TVDB 18 would then be requested to send an updated TV channel list 19 to all TV band devices 12 within that area to exclude their transmissions from that particular TV channel.

As will be understood by those skilled in the art, a jammer can only influence a TV band device 12 using embodiments described herein, if the jammer broadcasts a signal type that can be detected by the spectrum sensor 14. Furthermore, the TV white space management logic 16 does not instruct the spectrum sensor 14 to sense channels with "undetectable", "prohibited" or "empty" signal types. In other words, those channels cannot be jammed. If a channel is "empty" but a detectable signal appears on it, the signal is most likely a jamming signal. This renders jamming more difficult to accomplish, as well as less harmful.

Embodiments described herein also provides better protection for incumbent TV signals. For channels with the "undetectable" signal type, or if the TV band device 12 is located in an excluded area such as the U.S./Canadian border region, the method described above enables the geo-location and database lookup approach to provide incumbent protection, because such signal types cannot be reliably protected by spectrum sensing alone. Furthermore, for channels with "detectable" signal types, spectrum sensing results are used to determine if licensed signals are present. And, as explained above the "prohibited" signal type provides governing authorities with a capability to exclude TV band devices 12 from broadcasting on any given channel, which ensures tailored incumbent signal protection.

Figure 3:
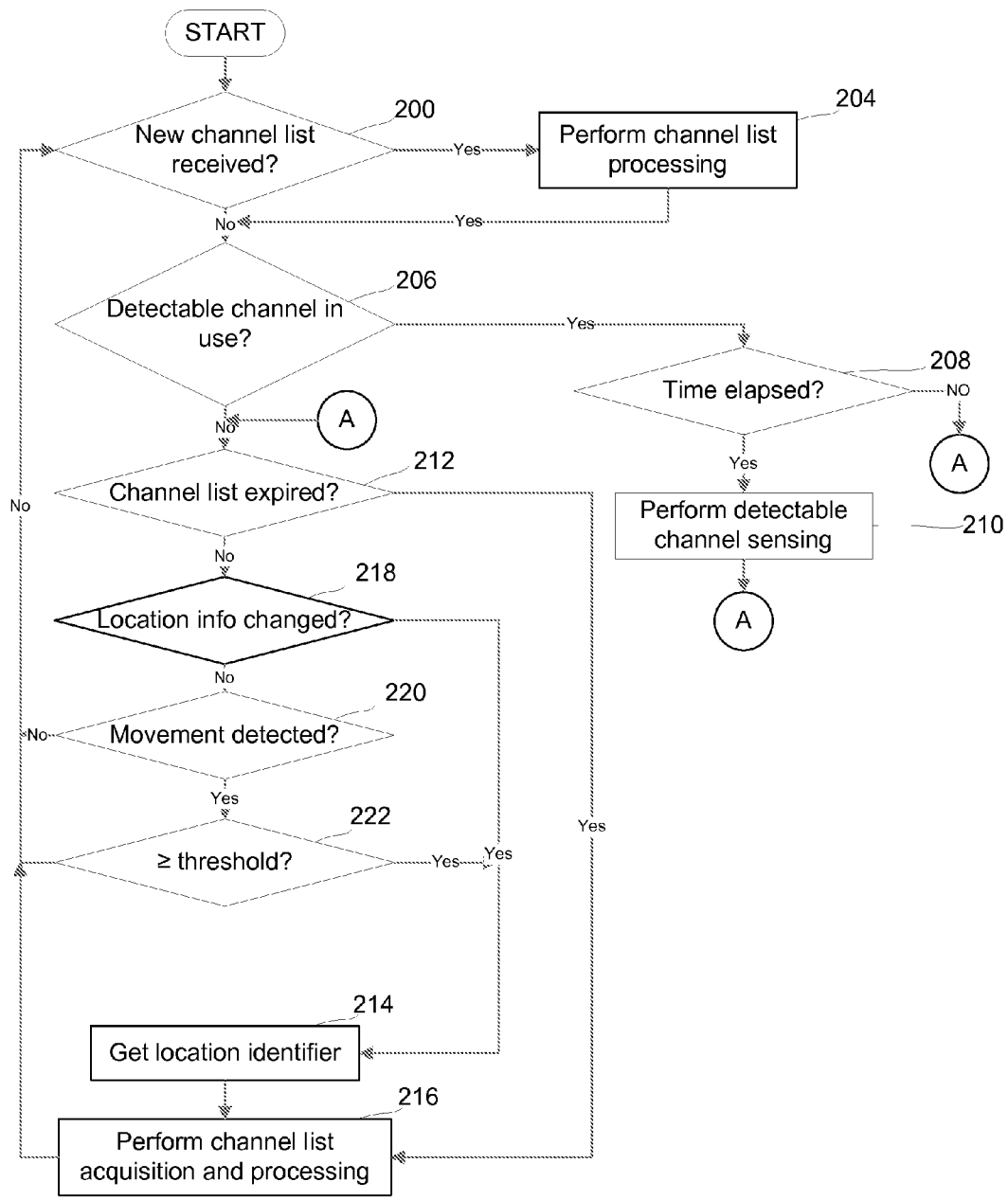
FIG. 3 is a flow chart of an overview of one implementation of a behavior of the TV band device after it has begun transmission on a TV white space channel.

FIG. 3 is a flow chart of one implementation of an embodiment of a method in accordance with the invention after the TV band device 12 has begun transmission on a TV white space channel. There may be many events or conditions that trigger the TV white space management logic 16 to conduct part, or all of, the TV white space channel location process. For example, as shown in FIG. 3, the TV white space management logic 16 must continually monitor (200) for receipt of a new TV channel list 19 from the TVDB 18, because a governing authority may direct the TVDB 18 to distribute the new TV channel list 19 to all TV band devices operating in a given location at any time. If a new TV channel list 19 is received from the TVDB 18, the TV white space management logic 16 must perform TV channel list processing (204) as described above with reference to steps (110)-(130) of FIG. 2. Alternatively, the TV white space management logic 16 can analyze the list to determine whether the status of any of the white space channels has changed. Changed channels can then be processed, for example, according to the method described in connection with FIG. 2.

If a new TV channel list 19 has not been received, the TV white space management logic 16 determines (206) if a white space channel with "detectable" type signals is currently being used. If so, the TV white space management logic 16 determines (208) if a predetermined period of permitted use without sensing has elapsed. If so, the TV white space management logic 16 performs detectable channel sensing as described above with reference to steps (120)-(130) of FIG. 3. However, if the permitted use time without sensing has not elapsed, the TV white space management logic 16 determines (212) if the current TV channel list 19 has expired. The expiry time for a TV channel list 19 may be established by a standard, or assigned by the TVDB 18 each time it sends out a new TV channel list 19. If the current TV channel list 19 has expired, the TV white space management logic 16 performs (216) channel list acquisition and processing, as described above with reference to steps (106)-(130) of FIG. 2.

If the TV channel list 19 has not expired, the TV white space management logic 16 determines (218) if its location information has changed. If so, the TV white space management logic 16 sends (214) its new location information to the variable resolution geo-location server 20 and acquires and processes (216) a TV new channel list 19 as described above with reference to steps (104)-(130) of FIG. 2.

If the location information has not changed, the TV white space management logic 16 determines (220) if it has detected movement using any available motion sensing capability, for example global positioning system (GPS). If no motion has been detected, the TV white space management logic 16 returns to (200) and the process described above repeats. If motion has been detected, TV white space management logic 16 determines (222) if the extent of the movement exceeds a predetermined threshold, e.g. 50 meters. If so, the TV white space management logic 16 sends (214) its new location information to the variable resolution geo-location server 20 and acquires and processes (216) a TV new channel list 19 as described above with reference to steps (104)-(130) of FIG. 2.

As is well understood, the most commonly used geo-location method implemented in TV band devices 12 is GPS. However, GPS signals cannot be reliably received in an indoor environment. This makes incumbent protection using geo-location and database lookup difficult to implement for indoor TV white space applications. Embodiments of systems and methods in accordance with the invention can solve this problem by allowing multiple geo-location methods with variable geo-location resolution. With reduced geo-location certainty, incumbent protection can be guaranteed by making database inquiry results more conservative; however, this results in fewer TV white space channels in the inquiry results. This drawback is overcome by the method described above by relying on the spectrum sensor 14 to determine if a channel is usable by the TV band device 12.

In accordance with an embodiment, a spectrum sensor 14 that can detect some but not all broadcast signals (e.g. wireless microphone and other low bandwidth services cannot be detected) can be used by the TV band device 12. Of course, the fewer broadcast signals the spectrum sensor 14 of a TV band device 12 can detect, the fewer TV white space channels can be located and utilized by that TV band device 12, and the lower the TV white space efficiency. Moreover, with database inquiry results in accordance with embodiments described herein, only TV channels with "detectable" signal types need to be sensed. This reduces the number of channels as well as the types of signals that must be sensed, which appreciably decreases sensing overhead.

Those of skill will appreciate that the various illustrative logical blocks, modules, units, logic and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps, logic and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or logic or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

We claim:

1. A method of operating a white space sensing device, comprising:
   receiving a geo-location information which is input by a user;
   communicating the geo-location information to a variable resolution geo-location server via a communications link;
   receiving a location indicator from the variable resolution geo-location server via a communications link, the location indicator representative of the location of the device;
   providing the location indicator to a white space database front end to request a white space channel list from the white space database front end;
   analyzing the white space channel list to determine whether there are any white space channels indicated as empty;
   if there is a white space channel which is indicated on the white space channel list as empty, storing the status of that channel as available for transmissions;
   analyzing the white space channel list to determine whether there are any white space channels indicated as a channel where signals can be reliably detected by the device;
   sensing the white space channel indicated as a channel where signals on the white space channel can be reliably detected by the device to determine if any signals can be detected on the white space channel;
   if no signals are detected on the white space channel, storing the status of that channel as available for transmissions; and
   transmitting signals on one or more of the channels with a stored status of available for transmissions.

2. The method as claimed in claim 1 further comprising determining whether a current white space channel list has expired;
   if the current white space channel list has expired, providing the location indicator to a white space database front end to request a white space channel list from the white space database front end; and
   inspecting the new white space channel list to determine whether the status of any of the white space channels has changed.

3. The method as claimed in claim 1 wherein when the location of the device has changed, the method further comprises
   determining a new location indicator representative of the new location of the device;
   providing the new location indicator to the white space database front end to request a new white space channel list from the white space database front end; and
   inspecting the new white space channel list to determine whether the status of any of the white space channels has changed.

4. The method as claimed in claim 1, wherein if a white space channel where signals on the white space channel can be reliably detected by the device is in use, the method further comprises
   determining whether a predetermined period without sensing has elapsed;
   sensing the white space channel with the detectable signal type to determine if a signal can be detected on the white space channel; and
   if a signal cannot be detected on that white space channel, resuming use of that white channel for another predetermined period of use.

5. The method as claimed in claim 1 further comprising determining whether a current white space channel list has expired; and
   if the current white space channel list has expired, providing the location indicator to the white space database front end to request a new white space channel list from the white space database front end.

6. A TV band device, comprising:
- a spectrum sensor adapted to sense certain TV band signal types;
- a memory for storing geo-location information, which is input by a user, and a location indicator;
- a memory for storing a TV channel list, the TV channel list including channels and associated statuses, the statuses including an empty status indicating that the associated channel can be used for transmissions by the TV band device and a reliably detectable status indicating that the TV band device can detect signals on the associated channel; and
- TV white space management logic which communicates with the spectrum sensor, accesses the geo-location information and TV channel list in the memory, sends the user inputted geo-location information to a variable resolution geo-location server and receives the location indicator.

7. The TV band device as claimed in claim 6 wherein the TV white space management logic is adapted to interpret sensing information output by the spectrum sensor.

8. The TV band device as claimed in claim 6 wherein the TV white space management logic is adapted to access the geo-location information stored in the memory, extract the geo-location information, and package the geo-location information for communication with a variable resolution geo-location server.

9. The TV band device as claimed in claim 8 wherein the TV white space management logic is adapted to send the packaged geo-location information to the variable resolution geo-location server.

10. The TV band device as claimed in claim 9 wherein the TV white space management logic is adapted to receive the location indicator from the variable resolution geo-location server.

11. The TV band device as claimed in claim 10 wherein the TV white space management logic is further adapted to pass the location indicator to the TV white space database front end, which uses the location indicator to compile the TV channel list.

12. The TV band device as claimed in claim 11 wherein the TV white space management logic is further adapted to receive and process the TV channel list compiled by the TV white space database front end.

13. A method of enhancing spectrum sensing by a TV band device, comprising:
- storing a geo-location information, which is input by a user, on the TV band device;
- providing a variable resolution geo-location server with the geo-location information on the TV band device;
- receiving a location indicator from the variable resolution geo-location server;
- passing the location indicator to a TV white space database front end to request a TV channel list from the TV white space database front end;
- inspecting the TV channel list to determine whether there is a TV channel with an empty signal type designation; and
- marking the TV channel with an empty signal type designation as being available for use by the TV band device without regard to signal detection on the TV channel with an empty signal type design.

14. The method as claimed in claim 13 wherein, the method further comprises:
- searching the TV channel list for a TV channel with a detectable signal type designation;
- sensing the TV channel with the detectable signal type designation to determine if any signals can be detected on the TV channel; and
- if no signals are detected on the TV channel, marking the TV channel available for use by the TV band device.

15. The method as claimed in claim 14, further comprising:
- searching the TV channel list for another TV channel with a detectable signal type designation;
- sensing the other TV channel to determine if any signals can be detected on that other TV channel; and
- if no signals are detected on that other TV channel, marking that other TV channel available for use by the TV band device.

16. The method as claimed in claim 15 wherein, the searching, sensing and marking are repeated until all of the channels with the detectable signal type of the TV channel list have been sensed.

17. The method as claimed in claim 13 further comprising determining whether a current TV channel list has expired.

18. The method as claimed in claim 17, wherein if the current TV channel list has expired, the method further comprises:
- passing the location indicator to the TV white space database front end and requesting a new TV channel list from the TV white space database front end; and
- inspecting the new TV channel list to determine whether there is a TV channel with an empty signal type designation available for use by the TV band device.

19. The method as claimed in claim 14, wherein if a TV channel with a detectable signal type is in use, the method further comprises determining whether a predetermined period of use without sensing has elapsed.

20. The method as claimed in claim 19 wherein if the predetermined period of use has elapsed, the method further comprises:
- sensing the TV channel with the detectable signal type to determine if a signal can be detected on the TV channel; and
- if a signal cannot be detected on that TV channel, resuming use of that TV channel for another predetermined period of use.

21. The method as claimed in claim 13 wherein the method further comprises determining whether the geo-location information has changed.

22. The method as claimed in claim 13 wherein if the geo-location information has changed the method further comprises:
- providing the variable resolution geo-location server with the changed geo-location information;
- receiving a new location indicator from the variable resolution geo-location server;
- passing the new location indicator to the TV white space database front end and requesting a new TV channel list from the TV white space database front end; and
- inspecting the new TV channel list to determine whether there is a TV channel with an empty signal type designation available for use by the TV band device.

23. The method as claimed in claim 13 wherein the method further comprises determining whether movement of the TV band device has been detected.

24. The method as claimed in claim 23 wherein if movement of the TV band device has been detected, the method further comprises determining whether an extent of the movement exceeds a predetermined threshold.

25. The method as claimed in claim 24 wherein if the movement exceeds the predetermined threshold, the method further comprises:

providing the variable resolution geo-location server with geo-location information associated with a new location of the TV band device;
receiving a new location indicator from the variable resolution geo-location server;
passing the new location indicator to the TV white space database front end and requesting a new TV channel list from the TV white space database front end; and
inspecting the new TV channel list to determine whether there is a TV channel with an empty signal type designation available for use by the TV band device.

\* \* \* \* \*